June 10, 1930.  R. S. HOPKINS  1,763,630
PHOTOGRAPHIC PRINTER
Filed April 3, 1928   2 Sheets-Sheet 1
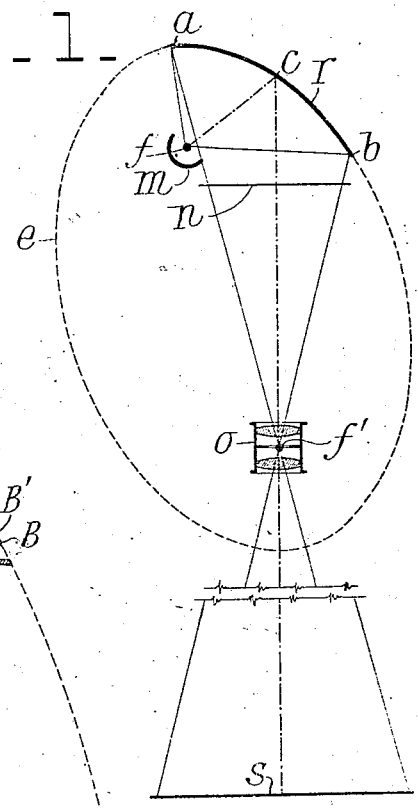
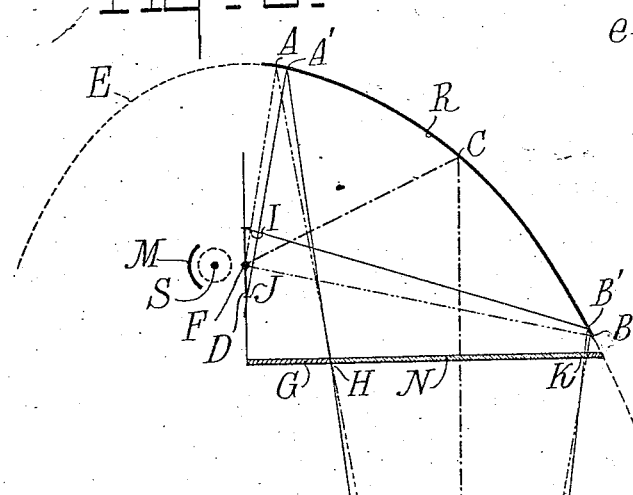
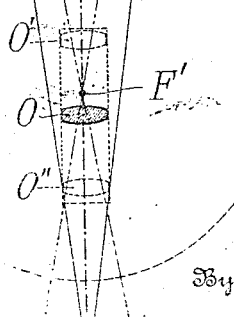
Inventor,
Roy S. Hopkins,
Attorneys

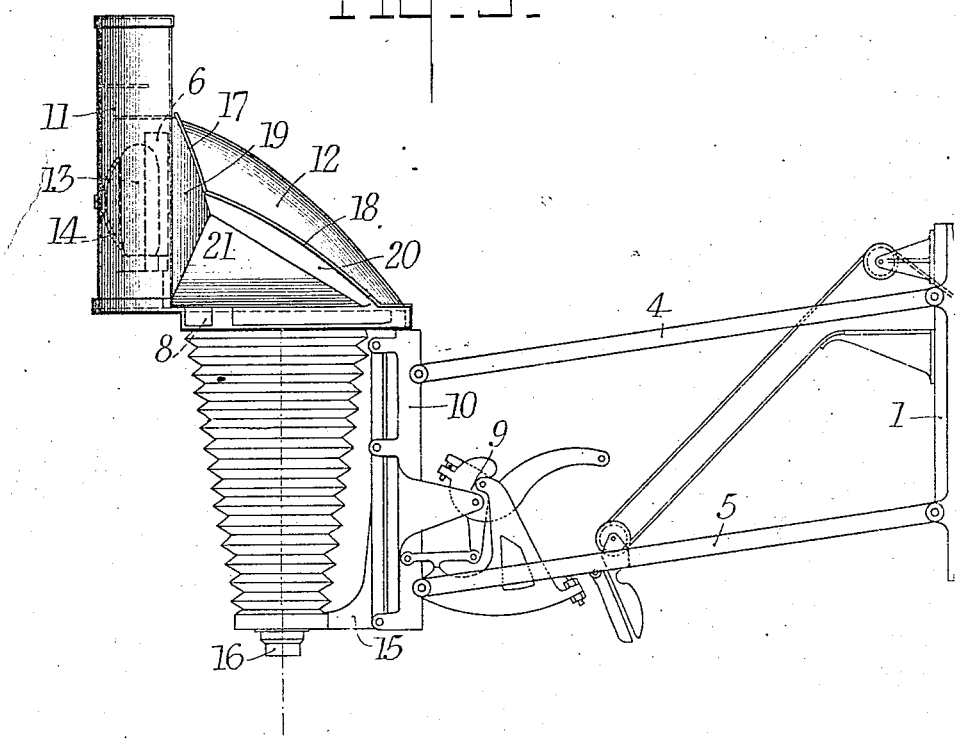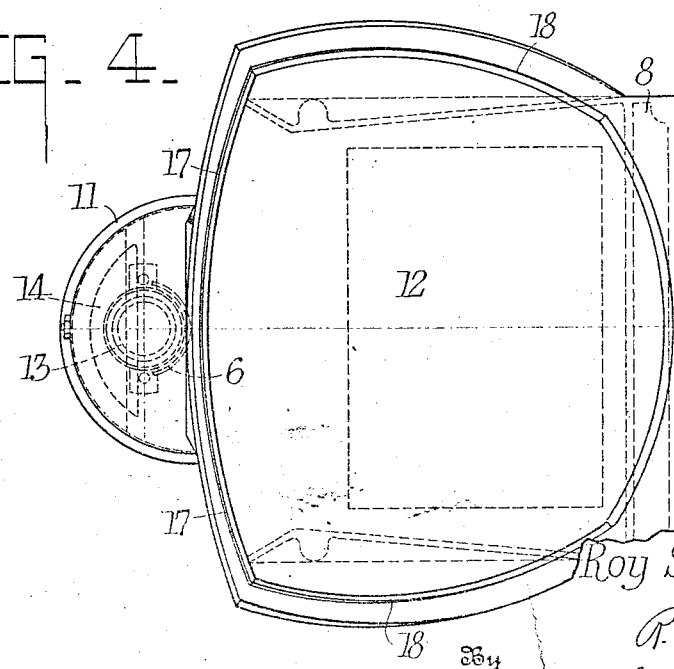

Patented June 10, 1930

1,763,630

UNITED STATES PATENT OFFICE

ROY S. HOPKINS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC PRINTER

Application filed April 3, 1928. Serial No. 267,016

This invention relates to a projector or photographic printer, and more particularly to the illuminating and optical system for an enlarger.

The objects of my invention are to provide even illumination of the negatives, to utilize efficiently the light from the lamp, to permit change of position of the objective with respect to the negative within the range of an efficient light beam, and to provide a structure that is simple in operation and inexpensive to manufacture.

I attain these objects by utilizing a reflector in the shape of a portion of an ellipsoid, one focus of which is approximately at the position of the lens and the other at the light source. If the light is sharply focused at the objective, it has the disadvantages of sharply reproducing filament images and also defects of the reflecting surface, and of the negatives, and of giving at the objective such a concentrated beam that there is little latitude for movement of the objective for the purpose of focusing.

I overcome this objection by utilizing as a light source a more extended area, the image of which is projected as a wider beam permitting the adjustment of the objective and still maintaining a highly efficient use of the light.

Other objects and advantages will appear from the following description wherein reference is made to the accompanying drawings in the several figures of which the same reference characters indicate the same parts, and in which Figs. 1 and 2 are diagrams used to explain the optical principles of my invention;

Fig. 3 is a side view of a photographic enlarger embodying my invention;

Fig. 4 is a plan view of the improved lamp house and reflector.

Referring to Fig. 1, an ellipse $e$ is shown having the conjugate foci $f$ and $f'$. This is to be considered as the section of an ellipsoid of revolution about the axis through $ff'$. If the interior of the ellipsoid is specularly reflective, rays emanating from one focus will be reflected to the other focus. If a portion only of the ellipsoid such as the portion $r$ indicated by a heavy line, is utilized, there will be directed from one focus to the other a corresponding beam having the limiting rays $f\ a\ f'$ and $f\ b\ f'$ and an axial ray $f\ c\ f'$. If a transparency or negative $n$ is placed transversely of this beam, a light source at $f$, and an objective $o$ at $f'$, the transparency will be evenly illuminated with high efficiency of the utilized rays, which may be increased by placing behind the light a spherical mirror $m$ having its center of curvature at $f$, and the objective $o$ will project an image of $n$ upon a screen $s$ positioned at the corresponding conjugate focal distance.

The above arrangement while highly efficient has the disadvantage that all blemishes, particularly of the reflector $r$, are reproduced and that, upon movement of the objective for focusing, the beam of light does not fill the objective mount. While it is possible to focus to give different magnifications by adjusting the negative and the screen, that is not as convenient as the adjustment of the lens and the screen.

In order to obtain a beam permitting adjustment of the lens and also giving a sufficiently high efficiency and freedom from the effects of surface defects, I modify this system by utilizing a more extended light source, as shown in Fig. 2. Here the reflecting surface R is a portion of an ellipse E having the foci F and F'. The light source S is placed somewhat at one side of the focus F and a diffusing screen D passed through this focus. Behind S is placed a spherical mirror M preferably having its center of curvature at S, so that there is formed on the screen D a brightly luminous area I J, from which most of the light proceeds, surrounded by a less luminous area. A support G for a transparency or negative N has a window, the ends of which are indicated at H and K. Light from F, at approximately the center of the luminous area is focused at F', the limiting rays being F A H F' and F B K F' and the axial rays being F C F'. Light from the edges of the luminous area as from points I and J are not sharply focused at F', the limiting rays for the entire beam from the luminous area I J passing through the printing window being J A' H U and I B' K V.

The greatest portion of the light is, therefore, concentrated in a beam which is as wide as the objective O at all points, and permits adjustment of the lens to any extent desirable or necessary for focusing as indicated by the dotted line positions O' and O''.

The placing of the lamp at one side of the negative and using an unsymmetrical portion of the ellipsoid gives much more even illumination than utilizing a mirror surface corresponding to the end of the ellipsoid symmetrical to its axis because the presence of the lamp bulb and the necessity of breaking into the surface to provide a mount for the lamp unavoidably causes rings of uneven illumination. As light proceeds from all points of area I J to all points of the surface R, and is thence reflected along the beam, irregularities in the surface are much less troublesome than when the light proceeds from a concentrated or point light source.

A practical embodiment of my invention is illustrated in Figs. 3 and 4 in which the lamp house and reflector are shown as applied to an automatically focusing enlarger of the type disclosed in my Patent No. 1,623,538, granted April 5, 1927, comprising an upright support 1, to which are pivoted links 4 and 5 carrying at their ends a support 10 upon which the support 15 for the objective mount 16 is movably mounted, being controlled in its movement by the mechanism 9, which is fully described in said patent.

The negative holder is shown at 8, and is rigidly carried by support 10. It carries the reflector 12 in the form of a portion of an ellipsoid, and opening at one side into the lamp house 11 in which is a lamp 13, spherical reflector 14 and a semi-cylindrical opal glass 66. The edge 17 of the reflector joins the flat wall 19 and the edge 18 joins an overhanging connecting strip 20 and this joins flat side wall 21. The shape, position and function of corresponding parts are as described in connection with Fig. 2.

It is to be noted that air can circulate freely up through the lamp house, independently of the negative and that no direct rays from the lamp fall on the negative, reducing greatly the heat directly affecting the negative.

It is obvious that other embodiments of my invention may be made, and I contemplate as within my invention all such modifications and equivalents as fall within the scope of the appended claims.

Having thus described my invention, what I claim as new and desire to secure by Letters Patent is:

1. In a photographic printer, a frame having an exposure window, a casing comprising a reflector portion and a lamp house mounted upon said frame holder, the reflector being in the shape of a portion of an ellipsoid of revolution unsymmetrical to the axis of such ellipsoid, a translucent, light diffusing screen in said casing in the region of one focus of said ellipsoid, and an illuminating system behind said screen illuminating a definite extended area of said screen in the region of said focus.

2. In a photographic printer, a frame having an exposure window, a casing comprising a reflector portion and a lamp house mounted upon said frame holder, the reflector being in the shape of a portion of an ellipsoid of revolution unsymmetrical to the axis of such ellipsoid, a translucent light diffusing screen in said casing in the region of one focus of said ellipsoid and an illuminating system behind said screen illuminating a definite extended area of said screen in the region of said focus, said screen and system being entirely out of direct alignment with any portion of the window.

3. In a photographic printer, a frame having an exposure window, a casing comprising a reflector portion and a lamp house mounted upon said frame holder, the reflector being in the shape of a portion of an ellipsoid of revolution unsymmetrical to the axis of such ellipsoid, a translucent, light diffusing screen in said casing in the region of one focus of said ellipsoid, a light behind said screen and a concave spherical reflector behind the lamp whereby a definite extended area of the screen in the region of the focus is illuminated.

4. In a projector, a frame having an exposure window, a reflector mounted upon one side of said frame and in the shape of a portion of an ellipsoid unsymmetrical of the axis of such ellipsoid, a lamp house at one side of the reflector and opening into the reflector, an extended light source in the lamp house and positioned at one focus of the ellipsoid whereby a concentrated but not sharply focused beam of light is thrown through the window about the other focus of the ellipsoid, and an objective mounted in said beam in the region of the said other focus, and adjustable toward and from the negative holder.

5. In a projector, a frame having an exposure window, a reflector mounted upon one side of said frame and in the shape of a portion of an ellipsoid unsymmetrical of the axis of such ellipsoid, a lamp house at one side of the reflector and opening into the reflector, an extended light source in the lamp house and positioned at one focus of the ellipsoid whereby a concentrated but not sharply focused beam of light is thrown through the window about the other focus of the ellipsoid, and an objective mounted in said beam in the region of the said other focus, and adjustable toward and from the negative holder, said lamp house being entirely out of alignment with any portion of the window.

6. In a projector, a frame having an exposure window, a casing comprising a concave reflector and a lamp house mounted upon said frame, the reflector being in the shape of a portion of an ellipsoid, and unsymmetrical to the axis of such ellipsoid, a translucent light diffusing screen in the region of one focus of the ellipsoid and an illuminating system behind the screen for illuminating a definite extended area of the screen in the region of said focus, the screen and system being in the casing and out of alignment with the window, whereby a concentrated but not sharply focused beam of light is projected through the window to the region of the other focus, and a movable objective mounted in the beam in the region of the other focus for adjustment toward and from the window.

7. In a projector, a frame having an exposure window, a casing comprising a reflector portion and a lamp house mounted upon one side of the frame, the reflector being in the shape of a portion of an ellipsoid of revolution unsymmetrical to the axis of such ellipsoid, a translucent, light diffusing screen in the casing in the region of one focus of said ellipsoid and out of alignment with the window, a lamp behind the screen and a concave mirror behind the lamp whereby an extended luminous area is formed on the screen in the region of one focus of the ellipsoid, and whereby a concentrated but not sharply focused beam of light is reflected by said ellipsoidal reflector from the luminous area through the window to the region of the other focus, and a movable objective mounted in said beam in the region of the other focus and adjustable toward and from the frame.

8. In a photographic projection printer, a negative holder having an exposure window, a reflector mounted upon one side of said exposure window and in the shape of a portion of an ellipsoid unsymmetrical to the axis of such ellipsoid, a lamp house at one side of the reflector and opening into the reflector, a translucent diffusing screen in the lamp house in the region of one focus of the ellipsoid, a lamp in the lamp house and behind the screen, a concave reflector behind the lamp, whereby a luminous area is formed on the screen in the region of said focus and whereby a concentrated but not sharply focused beam of light is reflected by said ellipsoidal reflector from said luminous area through the negative holder about the other focus of the ellipsoid and a movable objective mounted in said beam in the region of the said other focus, and adjustable toward and from the negative holder.

9. In a photographic projection printer, a negative holder having an exposure window, a reflector mounted upon one side of said exposure window and in the shape of a portion of an ellipsoid unsymmetrical to the axis of such ellipsoid, a lamp house at one side of the reflector and opening into the reflector, a translucent diffusing screen in the lamp house in the region of one focus of the ellipsoid, a lamp in the lamp house and behind the screen, a concave reflector behind the lamp, whereby a luminous area is formed on the screen in the region of said focus and whereby a concentrated but not sharply focused beam of light is reflected by said ellipsoidal reflector from said luminous area through the negative holder about the other focus of the ellipsoid, and a movable objective mounted in said beam in the region of the said other focus and adjustable toward and from the negative holder, said lamp house being entirely out of alignment with any portion of said window.

Signed at Rochester, New York this 28 day of March, 1928.

ROY S. HOPKINS.